United States Patent
Mantha et al.

(10) Patent No.: US 7,343,543 B2
(45) Date of Patent: Mar. 11, 2008

(54) METHOD, SYSTEM AND APPARATUS FOR TRANSMITTING INTERLEAVED DATA BETWEEN STATIONS

(75) Inventors: Ramesh Mantha, Toronto (CA); Jeffrey P. Castura, Ottawa (CA); Frank M. Van Heeswyk, Toronto (CA)

(73) Assignee: SOMA Networks, Inc., San Francisco, CA (US)

( * ) Notice: Subject to any disclaimer, the term of this patent is extended or adjusted under 35 U.S.C. 154(b) by 440 days.

(21) Appl. No.: 10/484,705

(22) PCT Filed: Jul. 19, 2002

(86) PCT No.: PCT/CA02/01109

§ 371 (c)(1),
(2), (4) Date: Jul. 6, 2004

(87) PCT Pub. No.: WO03/013046

PCT Pub. Date: Feb. 13, 2003

(65) Prior Publication Data

US 2004/0240409 A1 Dec. 2, 2004

(30) Foreign Application Priority Data

Jul. 27, 2001 (CA) .................................. 2354285

(51) Int. Cl.
- *H03M 13/00* (2006.01)
- *H04B 7/216* (2006.01)
- *H03C 7/02* (2006.01)

(52) U.S. Cl. ..................... 714/762; 714/761; 370/342; 370/328; 455/101

(58) Field of Classification Search ................ 714/762, 714/761; 370/342; 455/101
See application file for complete search history.

(56) References Cited

U.S. PATENT DOCUMENTS

| 5,483,541 A * | 1/1996 | Linsky ........................ 714/701 |
| 6,744,744 B1 * | 6/2004 | Tong et al. .................. 370/320 |
| 2003/0053435 A1 * | 3/2003 | Sindhushayana et al. ... 370/342 |

FOREIGN PATENT DOCUMENTS

| JP | 07058646 A | 3/1995 |
| JP | 2000299680 A | 10/2000 |
| JP | 2001160988 A | 6/2001 |
| JP | 2001177877 A | 6/2001 |

* cited by examiner

*Primary Examiner*—William Trost
*Assistant Examiner*—Christopher M Brandt
(74) *Attorney, Agent, or Firm*—Katten Muchin Rosenman LLP

(57) ABSTRACT

A system for transmitting data between stations, such as base stations and subscriber stations in a wireless telecommunications system, employs variable set of interleaving parameters for its interleaving operations. By using different set of interleaving parameters with the interleavers, data which would otherwise be aligned when transmitted from a station to many stations, or from many stations to a station, will not be aligned after interleaving has been performed. This reduces the peak to average ratio required for a transmitter and/or can reduce interference experienced at receivers in the system. This is especially true if a significant proportion of the otherwise aligned signals are symbols which require zero energy to transmit.

25 Claims, 7 Drawing Sheets

S1A

S1B

S1C

S1A

S1B

S1C

S1A

S1B

S1C

METHOD, SYSTEM AND APPARATUS FOR TRANSMITTING INTERLEAVED DATA BETWEEN STATIONS

FIELD OF THE INVENTION

The present invention relates generally to a method and system for transmitting interleaved data between stations. More specifically, the present invention relates to a method, system and apparatus for varying the interleaving patterns between different transmissions of information signals representing data. Each transmission, whether different channels from the same transmitter at one station or different channels sent by transmitters at different stations, uses a different interleaving pattern for the signals on the channels, which are intended to be received at a receiver at a station.

BACKGROUND OF THE INVENTION

Communications systems use numerous techniques to improve reception quality and data rates, to manage the probability of an error being experienced at a receiver and to make efficient use of available, and limited, bandwidth. One common technique used is to interleave the information signals, referred to herein as "code symbols", before transmission of the code symbols. Interleaving reorders the code symbols across a group, frame, slot or other number of code symbols. Usually, interleaving is employed in combination with code symbol repetition, or other error correcting techniques, in order to mitigate the effects of a burst error occurring during reception of the transmitted signal. Specifically, an error resulting in the loss of some number of adjacent code symbols in a set of symbols received at a receiver can be corrected by the receiver processing the remaining received symbols to reconstruct the lost code symbols from the redundant symbols spread throughout the set.

For example, if three code symbols to be sent are represented as 'abc', they could be repeated to yield a set 'aaabbbccc'. A burst error could result in reception of 'aaa****cc', where '*' represents the symbols obscured by a noise burst and, as will be apparent, symbol 'b' has been irretrievably lost. Interleaving the repeated symbols could rearrange the code symbols to yield a set 'abcabcabc' and, if the same burst error is experienced at the receiver, would result in reception of 'abc****bc' from which the transmitted symbols, including 'b', can be recovered. Specifically, by spreading the repeated, or otherwise redundant, code symbols across a period of time, redundant bits are dispersed away from each other, so that transmission errors are also effectively spread across time and become easier to correct using techniques such as forward error correcting (FEC). Hence, the receiver can recover 'abc' as the transmitted code symbols.

One wireless communication system presently under development and deployment is the 3GPP standard, developed by the Third Generation Partnership Project organization and documented in the technical documentation available from the web site of the organization, www.3gpp.org and many other sources. Within the proposed 3GPP standard, code symbols are transmitted in a format comprising frames of data, each frame having a ten millisecond (10 ms) transmission duration and being sub-divided into fifteen time slots. 3GPP typically employs interleaving depths of between 10 ms and 80 ms, meaning that code symbols are interleaved in arrangements that span between one and eight frames of transmitted code symbols.

While generally an increase in the depth of interleaving results in an improved resistance to burst errors, the amount of interleaving depth that can be employed in a system is often limited by the amount of delay, or latency, that the interleaving will cause. For example, an interleaving depth equivalent to 30 ms of transmission time will introduce about 60 ms of latency into the signal path, comprising at least 30 ms of latency at the transmission end, while code symbols are accumulated for interleaving, and 30 ms of latency at the receiver end while enough code symbols are accumulated to be de-interleaved. With voice transmissions, latency over a certain length (typically 100 ms) will become audible to the listener, and would likely be considered unacceptable. With data transmissions, however, larger interleaving depths are often more tolerable.

Numerous interleaving techniques are known, including random interleaving, square interleaving (sometimes called matrix interleaving), and convolutional interleaving. At the receiver, a complementary de-interleaving operation is performed to recover the code symbols. As is known to those of skill in the art, different interleaving techniques can provide different performances under different conditions.

Other techniques employed include interleaving together different channels of information for the same receiver. Thus, if a channel A is to transmit code symbols $A_1$, $A_2$, $A_3$, $A_4$ and a channel B is to transmit code symbols $B_1$, $B_2$, $B_3$, $B_4$, and if a code repetition rate of two is employed (resulting in $A_1A_1A_2A_2A_3A_3A_4A_4$ and $B_1B_1B_2B_2B_3B_3B_4B_4$), the result of the interleaving operation could be that channel A sends $A_2$, $B_4$, $B_1$, $A_2$, $A_4$, $B_3$ $A_1$ and channel B sends $B_2A_4$, $A_1$, $B_2$, $B_4$, $A_3$, $B_1$. At the receiver, channels A and B are de-interleaved to recover the two sets of code symbols, $A_1$, $A_2$, $A_3$, $A_4$ and $B_1$, $B_2$, $B_3$, $B_4$.

While such interleaving operations can provide significant benefits, the present inventors have also determined that, under some circumstances, conventional interleaving operations and methods and result in problems and/or disadvantages.

SUMMARY OF THE INVENTION

It is an object of the present invention to provide a novel method, system and apparatus for transmitting data between stations, which obviates or mitigates at least some of the disadvantages of the prior art.

According to a first aspect of the present invention, there is provided a system for transmitting data between stations, comprising:

at least two transmitters, each operable to transmit different sets of code symbols over a wireless interface;

an interleaver means associated with each of said at least two transmitters and each interleaver means operable to interleave said sets of code symbols prior to transmission by the respective one of said at least two transmitters, each said interleaver means employing a different set of interleaving parameters during interleaving operations such that the set of interleaved code symbols produced by a first interleaver means have a different interleaving pattern than the set of interleaved code symbols produced by a second interleaver means;

at least one receiver, operable to receive said set of interleaved code symbols from at least one of said at least two transmitters over said wireless interface; and a de-interleaver means associated with said at least one receiver, operable to de-interleave said received set of code symbols in accordance with said set of interleaving parameters for said received set of code symbols.

According to another aspect of the invention, there is provided a system for transmitting data between stations, comprising:

at least two receivers;

at least one transmitter, operable to transmit set of code symbols over a wireless interface to said at least two receivers;

an interleaver means operable to interleave each said set of code symbols prior to transmission by said at least one receiver, said interleaver means employing a different set of interleaving parameters when interleaving said sets of code symbols intended for different receivers such that the sets of code symbols transmitted to different ones of said at least two receivers are interleaved in a different pattern than the sets of code symbols transmitted to another of said at least two receivers; and de-interleaving means associated with each of said at least two receivers, each said de-interleaving means employing said set of interleaving parameters for said set of corresponding interleaved code symbols to de-interleave said set of code symbols received by said receiver.

According to yet another aspect of the present invention, there is provided a method for reducing the peak to average ratio of the energy required to transmit sets of code symbols from a transmitter to at least two receivers, the sets of code symbols being transmitted to each of said two receivers in a synchronous manner, comprising the steps of:

(i) for each of said at least two receivers, assembling in a set a selected number of said code symbols to be transmitted to the receiver, each set including at least one code symbol requiring substantially zero power to transmit and each said at least one code symbol being temporally aligned with each said at least one code symbol in the set of code symbols to be transmitted to the other of said at least two receivers;

(ii) selecting a different set of interleaving parameters for interleaving each set of code symbols to be transmitted to each one of said at least two receivers;

(iii) for each receiver, interleaving the set of code symbols employing the corresponding set of interleaving parameters for the receiver such that said at least one code symbol in each set of code symbols is not temporally aligned with each said at least one code symbol in said set of code symbols to be transmitted to the other of said at least two receivers.

According to yet another aspect of the present invention, there is provided a system for transmitting at least two sets of data between stations, comprising:

at least one transmitter to transmit at least two sets of data from at least one station to at least a second station;

at least a second station including a receiver to receive said at least two sets of transmitted data;

at least one interleaver associated with each transmitter transmitting said at least two sets of data, said at least one interleaver operating to mis-align interleaved data transmitted in a first set with data transmitted in a second set.

The present invention provides a system and method for ensuring that data transmitted between stations does not include well-aligned code symbols after interleaving. In particular, DTX or other zero energy symbols are mis-aligned in the transmission of channels to reduce peak to average transmission energy requirements and/or to reduce interference between channels experienced at a receiver. Each station employs an interleaver which is operable to mis-align data in sets of symbols to be transmitted, the interleavers employing a different set of interleaving parameters to provide the mis-alignment.

BRIEF DESCRIPTION OF THE DRAWINGS

Preferred embodiments of the present invention will now be described, by way of example only, with reference to the attached Figures, in which.

DETAILED DESCRIPTION OF THE INVENTION

Figure 1:
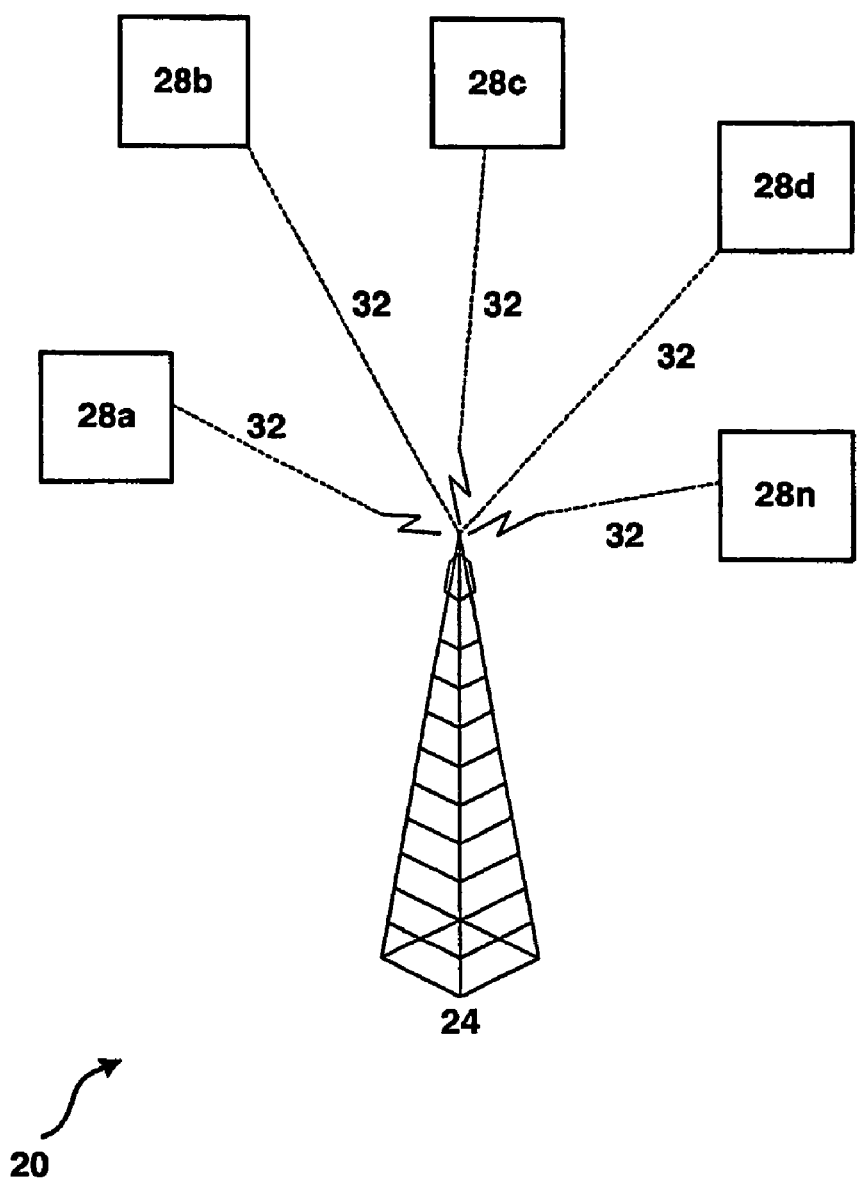
FIG. 1 is a schematic representation of a telecommunication system incorporating a data channel in accordance with an embodiment of the invention.

Referring now to FIG. 1, a wireless telecommunication system for transmitting data is indicated generally at 20. System 20 includes at least radio base station 24, and a plurality of subscriber stations 28a, 28b ... 28n. The number 'n' of subscriber stations serviced by a base station 24 can vary depending upon the amount of radio bandwidth available and/or the configuration and requirements of the subscriber stations 28.

In a presently preferred embodiment, radio base station 24 is connected to at least one telecommunications network (not shown), such as a land line-based switched data network, a public switched telephone network, etc. by an appropriate gateway and one or more backhauls (also not shown). These backhaul connections can be links such as T1, T3, E1, E3, OC3 or other suitable land line link, or can be a satellite or other radio or microwave channel link or any other link suitable for operation as a backhaul as will occur to those of skill in the art.

A wireless communications link 32 is established between base station 24 and each subscriber station 28 via radio. Communications link 32 can carry voice and data information from base station 24 to respective subscriber stations 28a, 28b ... 28n as needed. Communications link 32 can be implemented with networks using a variety of multiple access techniques, including TDMA, FDMA, CDMA, OFDM or hybrid systems such as GSM, etc. In a presently preferred embodiment of the invention, communications link 32 employs slotted frames to transmit information to subscriber stations 28, in a configuration similar to that described in the above-mentioned documentation of the 3GPP organization.

In a present embodiment, data transmitted over communications link 32 is transmitted as packets, which are arranged within frames. As understood by those of skill in the art, these frames are a logical grouping of the data and can be measured in terms of a duration of time and, in a present embodiment, each frame within communications link 32 requires 10 ms of transmission time, although longer or shorter transmission times can be selected if desired. These frames are subdivided into a number of time slots, and in the present embodiment, each frame is divided into fifteen slots. Depending upon the packaging of the data (including the selected data rates, spreading factors, modulations, amount of FEC coding, etc.) each slot can carry a given number of code symbols for transmission. These symbols can represent data, the actual amount of data being represented by a symbol depending on how the data is packaged into a code symbol. In a present CDMA embodiment of the invention, data is packaged using a combination of the CDMA spreading factor, modulation, symbol repetition and encoding. The present embodiment of the invention has a chip rate of three-million, eight-hundred and forty thousand chips per second (3.84 Mcps), so that each slot contains two thousand, five-hundred and sixty (2560) chips.

Figure 2:
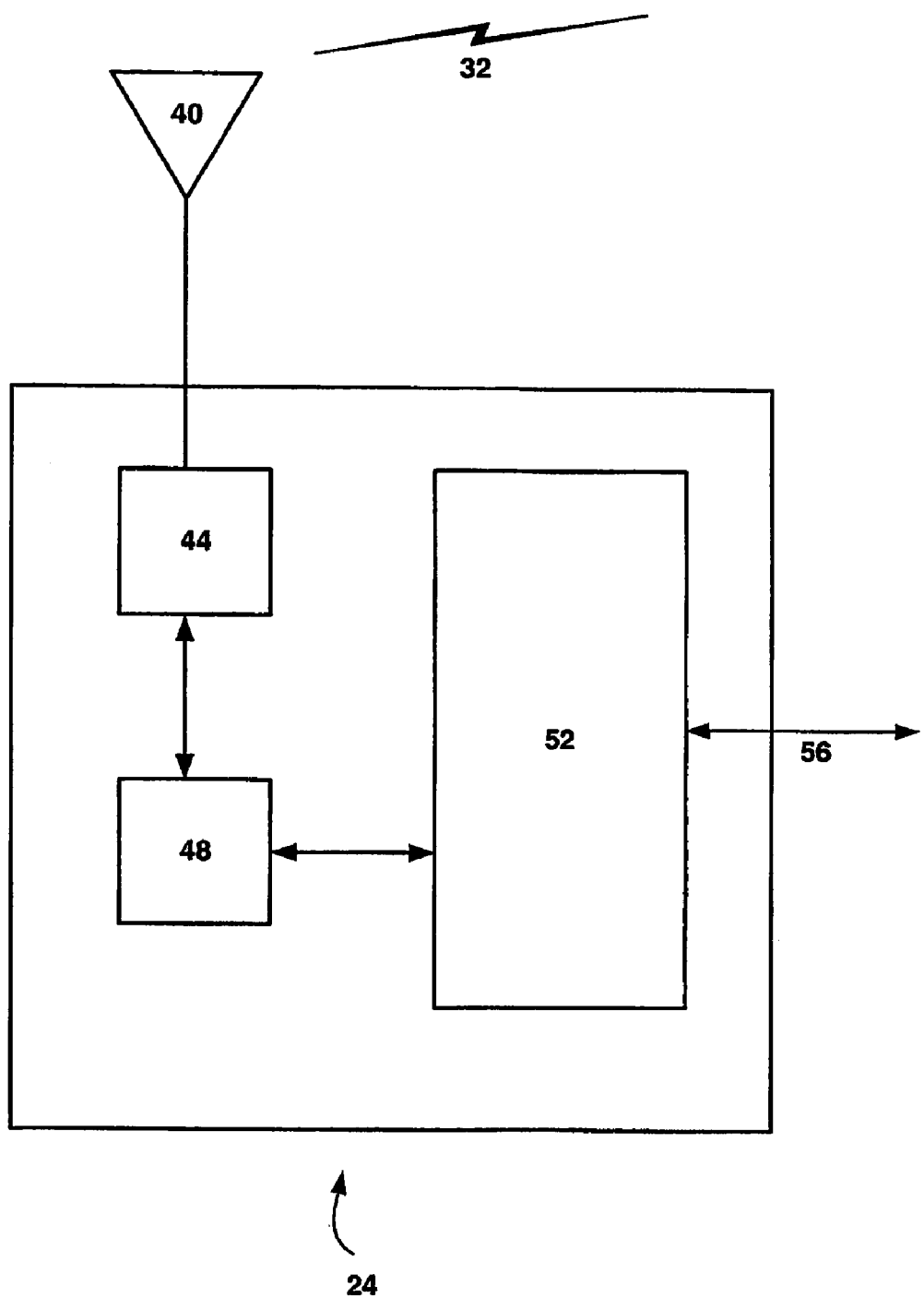
FIG. 2 is a schematic representation of the base station shown in FIG. 1.

FIG. 2 shows an example of base station 24 in greater detail. Base station 24 comprises an antenna 40, or antennas, for receiving and transmitting radio-communications over communications link 32. In turn, antenna 40 is connected to a radio 44 and a modem 48. Modem 48 is connected to a microprocessor-router assembly 52 such as a Pentium III™ processor system manufactured by Intel. It will be understood that assembly 52 can include multiple microprocessors, as desired and/or that the router can be provided as a separate unit, if desired. The router within microprocessor-router assembly 52 is connected to a backhaul 56 in any suitable manner, which in turn connects base station 24 to a telecommunications network (not shown).

Figure 3:
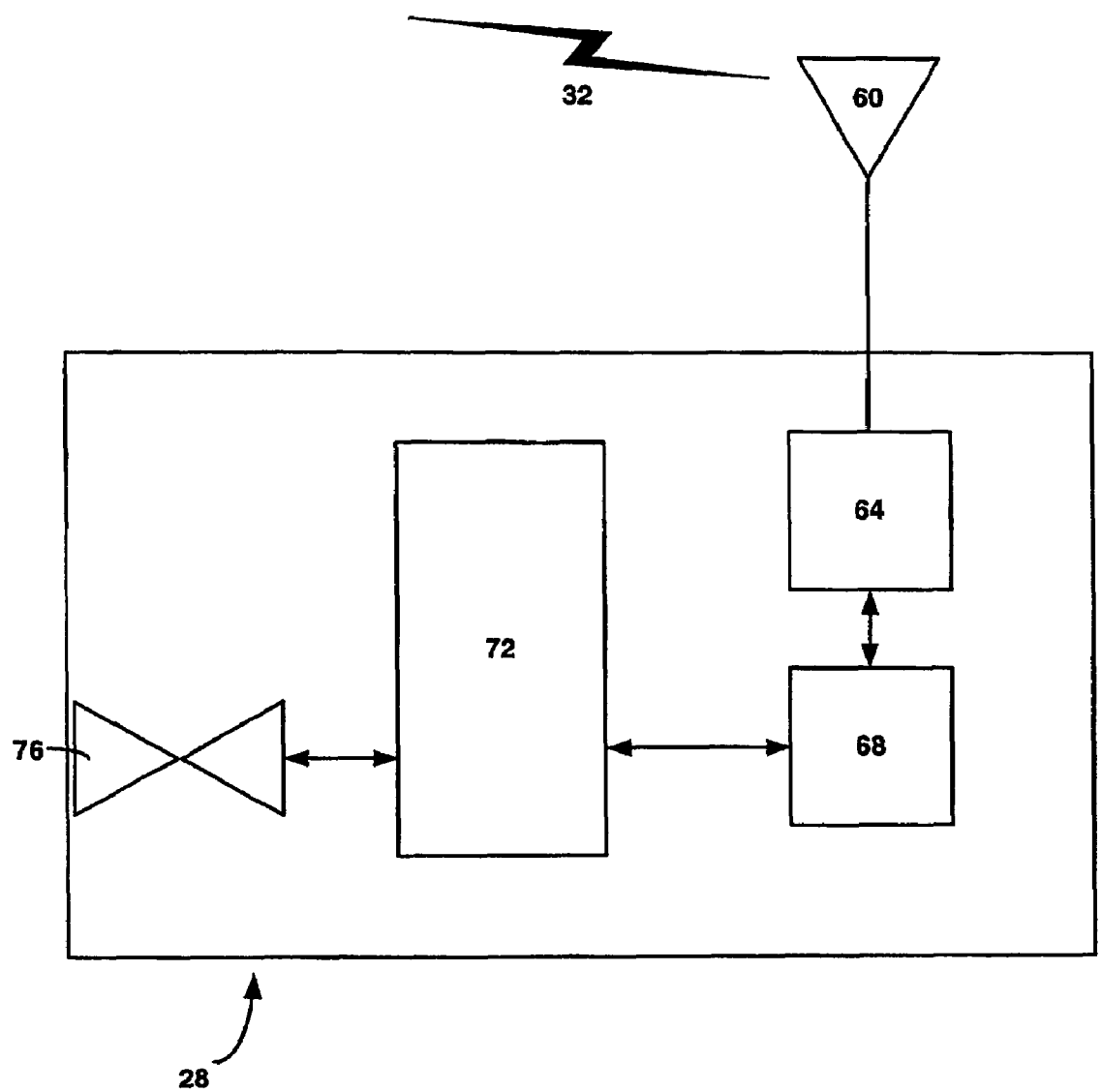
FIG. 3 is a schematic representation of one of the subscriber stations shown in FIG. 1.

Referring now to FIG. 3, an example of a subscriber station 28 is shown in greater detail. Subscriber station 28 comprises an antenna 60, or antennas, for receiving and transmitting radio-communications over communications link 32. In turn, antenna 60 is connected to a radio 64 and a modem 68, which in turn is connected to a microprocessor-assembly 72.

Microprocessor-assembly 72 can include, for example, a StrongARM processor manufactured by Intel, that performs a variety of functions, including implementing A/D-D/A conversion, filters, encoders, decoders, data compressors, de-compressors and/or packet disassembly. As seen in FIG. 3, microprocessor-assembly 72 interconnects modem 68 and one or more ports 76, for connecting subscriber station 28 to data devices and telephony devices. An example of a telephony device would be a telephone, or the like, which is operable to receive voice received over communications link 32. Examples of a data devices include personal computers, personal digital assistants or the like which is operable to use data received over communications link 32. Accordingly, microprocessor-assembly 72 is operable to process data between ports 76 and modem 68.

Figure 4:
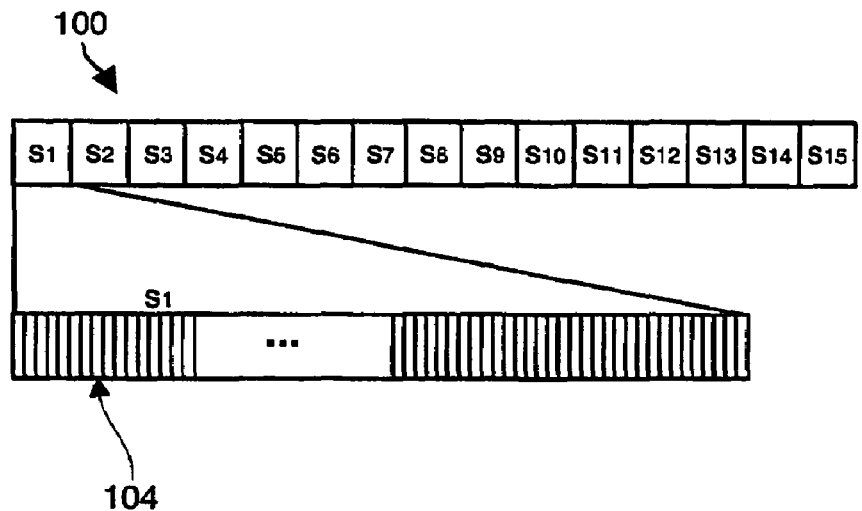
FIG. 4 is a schematic representation of the slots in a frame of code symbols to be transmitted.

Referring now to FIG. 4, a set, specifically a frame 100 of slots $s_1$ through $s_{15}$, of code symbols to be transmitted over communications link 32 is shown. The actual frame 100 of slots $s_i$ can be configured in a variety of known manners, the illustrated example being similar to that described in the proposed 3GPP standard. In a CDMA implementation, the information in each slot $s_i$ is transmitted as one or more chips 104 and, for a frame transmission time of ten milliseconds, with fifteen slots and a chip rate of three million; eight hundred and forty thousand chips per second, each slot $s_i$ contains two thousand, five hundred and forty chips 104. In the following description, for clarity an interleaving depth equal to a slot has been assumed while, in fact, in practice interleaving depths of at least a frame will likely, and more likely of multiple frames, be employed.

Figure 5A:
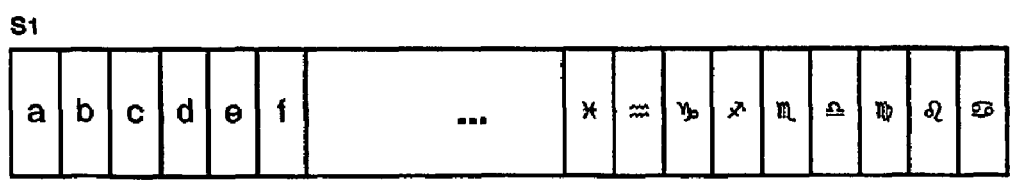
FIG. 5a is a schematic representations of a slot of code symbols for transmission over the system of FIG. 1.
Figure 5B:
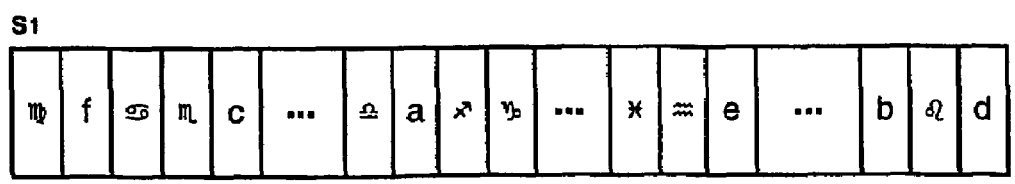
FIG. 5b is a schematic representation of the slot of FIG. 5a after interleaving.

FIG. 5a shows a slot $s_1$ before an interleaving operation is performed and FIG. 5b shows slot $s_1$ after the interleaving operation. As shown, the code symbols have been rearranged within slot $s_1$.

Figure 6:
FIG. 6 is a schematic representation of slots from three different frames of code symbols.
Figure 6:
Figure 6:
Figure 7:
FIG. 7 is a schematic representation of the slots of FIG. 6 after a conventional interleaving operation is performed.
Figure 7:
Figure 7:

FIG. 6 shows the first slot $s_{1A}$, $s_{1B}$, $s_{1C}$ from each of tee frames (not shown) from respective channels A, B and C which are to be transmitted, either simultaneously by a single transmitter or by different transmitters, and which have not yet been interleaved. As is known, depending on the data rate, chip rate, frame and slot sizes to be transmitted, the code symbols required to be transmitted may not fill the slots $s_i$. Typically, when a slot $s_i$ is not filled with data to be transmitted, one or more "DTX" (do not transmit) code symbols, which have a zero energy level, are inserted into the end of the slot to 'fill' it, as indicated by the "D's" in slots $s_{1A}$, $s_{1B}$, $s_{1C}$ of the Figure. As illustrated, slots $s_{1A}$ and $s_{1B}$ have had the same number of DTX code symbols inserted while slot $s_{1C}$ required fewer DTX code symbols to be inserted as its data to be transmitted was longer than that of slots $s_{1A}$ and $s_{1B}$. When a conventional interleaving operation is performed, the DTX code symbols are interleaved with the rest of the code symbols, as shown in FIG. 7. As illustrated in FIG. 7, because the same interleaving operation is performed on each slot, all of the DTX code symbols of slots $s_{1A}$ and $s_{1B}$ occur in the same positions (are aligned) within the interleaved slots, and the DTX code symbols present in slot $s_{1C}$ also are aligned with the position of the corresponding number of DTX code symbols in slots $S_{1A}$ and $s_{1B}$.

The amount of alignment of DTX code symbols will be significant in some cases. For example, in a wireless communication system with multiple users, it is expected that the data to be transmitted in most slots of voice (telephony) information will be of the same length (due to use of the same voice coder, data rate, FEC coding, frame length, transmission time, etc.) resulting in most, if not all, of those slots having the same number of DTX code symbols inserted to fill them. Thus, thirty or forty channels in system 20 can all be transmitted with DTX code symbols aligned between them. Also, as shown in FIGS. 6 and 7, even when one or more slots have a different number of DTX code symbols inserted, the number of DTX code symbols common to all of the slots will be aligned in the slots of all channels, as will the additional DTX code symbols in slots of channels which have such additional DTX code symbols. Specifically, as shown in FIGS. 6 and 7 slots $s_{1A}$ and $s_{1B}$ each have seven DTX code symbols which arm aligned, while the five DTX code symbols of slot $s_{1C}$ are aligned with five of the seven DTX's of slots $s_{1A}$ and $s_{1B}$.

While the above and the following discussion focuses on DTX code symbols which are appended to the data code symbols to be transmitted, it will be apparent to those of skill in the art that DTX code symbols can instead be pre-pended or even inserted at locations throughout the data code symbols in a defined manner, without departing from the present invention. For example, each of the receivers and transmitters can employ a suitable pseudorandom or other function, such as a hash function, to position the DTX code symbols into the data code symbols to be transmitted. In such a case, an inverse function can be performed at the receiver, provided that the number of DTX's transmitted are known, which could be inherent in the channel set up information exchanged and/or the type of data be transmitted. Alternatively, the transmitters and receivers can have access to a predefined lookup table, or the like, which defines where the DTX code symbols are to be positioned. As will be apparent to those of skill in the art, this is essentially a first stage of interleaving of the DTX code symbols into the data code symbols and would likely be followed by a second interleaving stage, such as with a convolutional interleaver.

In any event, the DTX code symbols will be aligned between channels and this alignment of DTX code symbols in the interleaved information to be transmitted results in various disadvantages and the present inventors have determined that by providing a system and method to ensure that interleaved DTX's do not align well between different channels, advantages can be obtained.

In the case of a single transmitter, such as base station transmitting signals to three subscriber stations in a wireless communication system via three channels A, B and C, and assuming that each channel will transmit information including forty aligned DTX code symbols out of two thousand five hundred and forty transmitted code symbols, the transmitter is required to send data (hence energy) for all three channels for some periods of time (2500/2540) and DTX's for all three channels for some periods (40/2540) of time. Specifically, the ratios of the time period in which maximum power transmission is performed versus the period in which zero power transmission is performed will be:

$$\text{Max} = \frac{2500}{2540} \text{ and Zero} = \frac{40}{2540}$$

Figure 8:
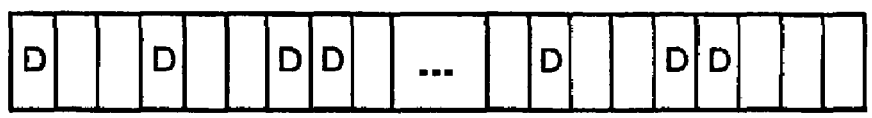
FIG. 8 is a schematic representation of the slots of FIG. 6 after interleaving operations in accordance with the present invention are performed.
Figure 8:
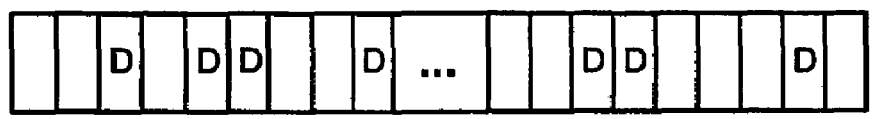
Figure 8:
Figure 9A:
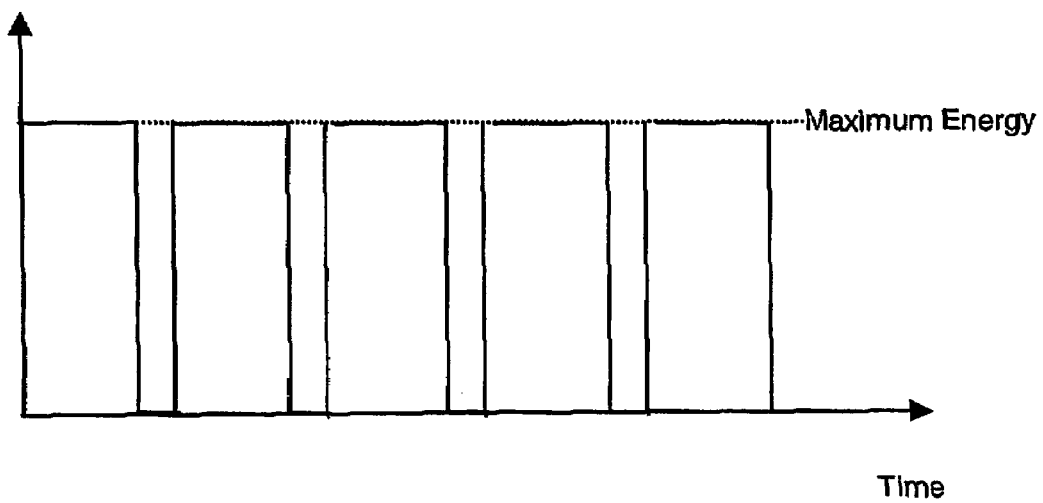
FIG. 9a shows the variations in transmitted power with aligned code symbols after interleaving.
Figure 9B:
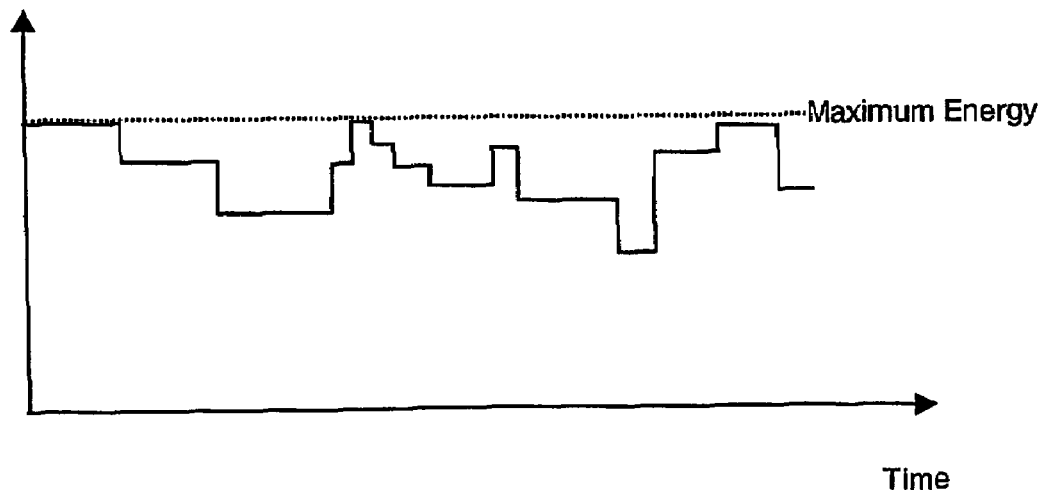
FIG. 9b shows the variations in transmitted power with code symbols that are mis-aligned after interleaving.

If the interleaving is performed so that the DTX's are mis-aligned, as shown in FIG. 8, the averaging of the required transmission energy reduces the peak to average energy ratio required from the transmitter in that, instead of transmitting full energy for some period and zero energy for some period of time, as shown in FIG. 9*a*, the transmitter will transmit full energy for some period of time and reduced amounts (depending how many DTX's are present) of energy for periods of time, as shown in FIG. 9*b*. As will be apparent, as the number of DTX's in the channels or the number of channels or both increases, a significant improvement in the peak to average ratio can be obtained.

As used herein, the terms "mis-aligned" or "not well aligned" are intended to convey that little, if any, alignment between all of the transmitted channels will occur. As will be apparent, depending upon the number of channels and the ratio of DTX code symbols to information to be transmitted, some alignment of some DTX code symbols between two or more channels may occur. For example, an alignment of the DTX code symbol at the fourth chip position occurs between slots $s_{1A}$ and $s_{1C}$ in FIG. 8. However, such minor amounts of alignment on a chip by chip basis between a subset of the total number of transmitted channels will not seriously detract from the advantages provided by the present invention.

Another advantage of the present invention occurs because, in CDMA systems, non-orthogonal transmissions act as interference to other transmitted signals. For example, the downlink orthogonal channels broadcast by a base station serve as interference to receivers attempting to receive the downlink orthogonal channels transmitted from adjacent base stations. Similarly, the uplink transmissions from two or more subscriber stations to a base station act as interference to each other.

With conventional systems that employ aligned DTX's, the alignment of the DTX's results in a reduction in interference only when there is no data to be transmitted. In other words, all channels will interfere with each other when information is transmitted and no interference occurs when the DTX's occur, but no information is transmitted then either. In contrast, in the present invention when DTX's are transmitted on one more channels, the other channels all experience a reduction in the interference they would otherwise have to overcome.

Accordingly, in the present invention, a variable interleaving technique is used to mis-align the DTX's from one another. In a present embodiment square interleaving, which is well known to those of skill in the art, is employed. Square interleaving places its inputs into a buffer, and then reads out the inputs in a different order to create the output. For example, inputs are written into the buffer matrix in rows, and read out in columns. For example, consider the sixteen signals [a, b, c, d, e, f, g, h, i, j, k, l, m, DTX, DTX, DTX] which can be placed into a 4×4 matrix, as illustrated below, by writing the values into the matrix on a row by row basis:

| a | b | c | d |
|---|---|---|---|
| e | f | g | h |
| i | j | k | l |
| m | DTX | DTX | DTX |

The elements can then be interleaved by being read out of the matrix on a column by column basis to yield the interleaved outputs [a, e, i, m, b, f, j, DTX, c, g, k, DTX, d, h, l, DTX], as shown:

| a | e | i | m | b | f | j | DTX | c | g | k | DTX | d | h | l | DTX |

If a second set of sixteen signals [n, o, p, q, r, s, t, u, v, x, y, z, DTX, DTX, DTX] are interleaved in the same manner.

| n | o | p | q |
|---|---|---|---|
| r | s | t | u |
| v | w | x | y |
| z | DTX | DTX | DTX | the DTX symbols will align with those of the other interleaved signal, as shown:

| a | e | i | m | b | f | j | DTX | c | g | k | DTX | d | h | l | DTX |
| n | r | v | z | o | s | w | DTX | p | t | x | DTX | q | u | y | DTX |

As determined by the present inventors, different offsets, interleaver increments or other interleaver parameter variations, can be employed with known interleaving techniques, such as square interleaving, to mitigate alignment of DTX's in the interleaved output.

Specifically, if an offset is employed when reading out the second interleaver matrix, alignment of the DTX symbols can be mitigated, or avoided. For example, if the second interleaver is offset by commencing readout of the second matrix at an offset of one row in the first column (i.e.— starting at signal r versus signal n) while the first interleaver is not offset, the interleaver results will be:

| a | e | i | m | b | f | j | DTX | c | g | k | DTX | d | h | l | DTX |
| r | v | z | o | s | w | DTX | p | | t | x | DTX | q | | u | y | DTX | n | and no alignment of the DTX symbols will occur, i.e. the channels are mis-aligned.

As will be apparent, interleaver parametric variations, such as offsets, increments, types of interleavers, etc. can be achieved in a variety of manners, such as defining a different row and/or column as a starting point for loading the signals into the matrix, a different row and/or column as a starting point for reading signals out of the matrix, etc. This selection can be predefined, or can be parametrically determined, etc. in a variety of manners, as will occur to those of skill in the art. Additional channels of signals will be interleaved with different parameters to ensure that the DTX symbols are mis-aligned in the resulting set of signals to be transmitted.

In the downlink direction, from base station 24 to subscriber stations 28, base station 24 can simply select and apply different parameters to its interleaving pattern to each of its channels and inform each subscriber station 24, typically at channel setup time, the parameters that have been applied. In the uplink direction from subscriber stations 28 to base station 24, it is presently contemplated that each subscriber station will select a set of parameters for its channel(s). Alternatively, base station 24 can assign one or more parameters to each subscriber station 28 while communicating with the subscriber station 28 to set up the channel. The parameter or parameters employed in the downlink to a subscriber station 28 and in the uplink from that subscriber station 28 need not be the same.

Further, as mentioned above, it is contemplated that the interleaving of the present invention can employ multiple rounds of interleaving. For example, the above-mentioned square interleaver can be employed to mis-align DTX or other repeated symbols and a second interleaver, such as a convolutional interleaver, can be employed on the result of the first interleaver. As another example, a pseudorandom process can be used to interleave DTX's or other repeated symbols while the set of code symbols is being formed and then a second interleaver, such as a convolutional interleaver, can be employed to interleave the result. Other alternatives and combinations will occur to those of skill in the art, but in all cases an appropriate set of parameters can be employed at one or more interleaver stages to ensure mis-alignment of the interleaved results.

The selection of either, or both, of the downlink and uplink parameters can be by a variety of means, including a pseudorandom process, by reference to a lookup table of appropriate parameters available to subscriber stations 28 and/or base station 24, by a hash function based on known data such as the IP address of the subscriber station 28, etc. Other means of assigning parameters to each channel will occur to those of skill in the art.

While the description above has concentrated on avoiding alignment of DTX code symbols in channels, the present invention is not limited to DTX's and affords benefits if the channels include any code symbols having the same values which would often otherwise be aligned. For example, in data communications systems employing packets, it is typical for the packet protocol to define a variety of information which will often be the same, both in content and location within the packets, in packets between different subscriber stations 28 and a base station 24. Examples of such often aligned data would include packet destination address fields, media type definitions, etc. Similarly, if the same data is transmitted from base station 24 to two or more subscriber stations 28, such as to update firmware in the subscriber stations 24, or to show a live streaming video, etc., the payload of the packets can be identical and system 20 will benefit from non-aligned interleaving of the transmitted signals.

Further, while the embodiment described above relates to a radio based wireless communications system, the present invention is not limited to radio based systems and can be employed with wireline, such as CATV data networks employing synchronous CDMA or the like or optical systems.

It is to be understood by those of skill in the art that modifications can be made to the above-described method without departing from the present invention. For example, different numbers of header bits, different frame durations, different chip rates, etc. can be employed. It is also contemplated that in system 20 with multiple base stations 24, each base station 24 could use different parameters from each other. Further, while the embodiments discussed herein are directed to multiple-access schemes conducted over wireless physical links and using CDMA as a multiple access technique, it will be understood that the present invention can be applied to a variety of physical links, such as over twisted-pair or coaxial links, and a variety of multiple-access schemes such as TDMA, FDMA, OFDM or CDMA.

The above-described embodiments of the invention are intended to be examples of the present invention and alterations and modifications may be effected thereto, by those of skill in the art, without departing from the scope of the invention which is defined solely by the claims appended hereto.

We claim:

1. A system for transmitting data between stations, comprising:
- at least two transmitters, each operable to transmit different sets of code symbols over a wireless interface;
- an interleaver means associated with each of said at least two transmitters and each interleaver means operable to interleave said sets of code symbols prior to transmission by the respective one of said at least two transmitters, each said interleaver means employing a different set of interleaving parameters during interleaving operations such that the set of interleaved code symbols produced by a first interleaver means have a different interleaving pattern than the set of interleaved code symbols produced by a second interleaver means;
- at least one receiver, operable to receive said set of interleaved code symbols from at least one of said at least two transmitters over said wireless interface; and
- a de-interleaver means associated with said at least one receiver, operable to de-interleave said received set of code symbols in accordance with said set of interleaving parameters for said received set of code symbols.

2. The system as claimed in claim 1 wherein said set of interleaving parameters is provided to each said interleaver means from said at least one receiver.

3. The system as claimed in claim 1 wherein said set of interleaving parameters is selected by each interleaver means in a manner known to said at least one receiver and said at least one receiver employs said known manner to determine said set of interleaving parameters to de-interleave said set of code symbols.

4. The system as claimed in claim 1 wherein each transmitter informs said at least one receiver of the set of interleaving parameters it has employed to interleave its transmissions.

5. The system as claimed in claim 1 wherein each said transmitter is a subscriber station and said at least one receiver is a base station.

6. The system as claimed in claim 1 wherein said interleaver is a square interleaver.

7. The system as claimed in claim 1 wherein said code symbols are transmitted in frames having a selected transmission duration.

8. The system as claimed in claim 7 wherein said frames comprise a fixed number of time slots, each slot having the same number of code symbols.

9. The system as claimed in claim 1 wherein CDMA is employed as a multiple access technique.

10. The system as claimed in claim 1 wherein said sets of transmitted code symbols include symbols transmitted at zero energy.

11. The system as claimed in claim 1 wherein said at least two transmitters are radio transmitters and said at least one receiver is a radio receiver.

12. A system for transmitting data between stations, comprising:
- at least two receivers;
- at least one transmitter, operable to transmit sets of code symbols over a wireless interface to said at least two receivers;
- an interleaver means operable to interleave each said set of code symbols prior to transmission by said at least one transmitter, said interleaver means employing a different set of interleaving parameters when interleaving said sets of code symbols intended for different receivers such that the sets of code symbols transmitted to different ones of said at least two receivers are interleaved in a different pattern than the sets of code symbols transmitted to another of said at least two receivers; and
- de-interleaving means associated with each of said at least two receivers, each said de-interleaving means employing said set of interleaving parameters for said set of corresponding interleaved code symbols to de-interleave said set of code symbols received by said receiver.

13. The system as claimed in claim 12 wherein said at least one transmitter informs each of said at least two receivers of the set of interleaving parameters for said set of interleaved code symbols transmitted to the respective receiver.

14. The system as claimed in claim 12 wherein each of said at least two receivers determines said set of interleaving parameters for said set of code symbols transmitted to it.

15. The system as claimed in claim 12 wherein said set of interleaved code symbols are transmitted in frames having a defined transmission duration.

16. The system as claimed in claim 12 wherein said at least one transmitter is a base station and said at least two receivers are subscriber stations.

17. The system as claimed in claim 12 wherein said interleaver means is a square interleaver.

18. The system as claimed in claim 15 wherein said frames comprise a fixed number of time slots, each slot having the same number of code symbols.

19. The system as claimed in claim 12 wherein CDMA is employed as a multiple access technique.

20. The system as claimed in claim 12 wherein said sets of transmitted code symbols include symbols transmitted at zero energy.

21. The system as claimed in claim 12 wherein said at least one transmitter is a radio transmitter and said at least two receivers are radio receivers.

22. A method for reducing the peak to average ratio of the energy required to transmit sets of code symbols from a transmitter to at least two receivers, the sets of code symbols being transmitted to each of said two receivers in a synchronous manner, comprising the steps of:
(i) for each of said at least two receivers, assembling in a set a selected number of said code symbols to be transmitted to the receiver, each set including at least one code symbol requiring substantially zero power to transmit and each said at least one code symbol being temporally aligned with each said at least one code symbol in the set of code symbols to be transmitted to the other of said at least two receivers;
(ii) selecting a different set of interleaving parameters for interleaving each set of code symbols to be transmitted to each one of said at least two receivers;
(iii) for each receiver, interleaving the set of code symbols employing the corresponding set of interleaving parameters for the receiver such that said at least one code symbol in each set of code symbols is not temporally aligned with each said at least one code symbol in said set of code symbols to be transmitted to the other of said at least two receivers.

23. The method as claimed in claim 22 wherein said set of code symbols is a frame of symbols, each said frame having a defined transmission duration.

24. The method as claimed in claim 22 wherein said code symbols are transmitted employing CDMA as a multiple access technique.

25. The method as claimed in claim 22 wherein said at least two receivers are radio receivers and said transmitter is a radio transmitter.

* * * * *